(12) United States Patent
Choi et al.

(10) Patent No.: US 11,748,224 B2
(45) Date of Patent: Sep. 5, 2023

(54) DETECTION AND ANALYSIS OF ENERGY CONSUMPTION OF SOFTWARE APPLICATIONS

(71) Applicant: Apple Inc., Cupertino, CA (US)

(72) Inventors: David S. Choi, Cupertino, CA (US); Christopher R. D'Angelo, Santa Clara, CA (US); Sanket V. Bedare, Milpitas, CA (US); Sathish K. Narayanaswamy, San Jose, CA (US); Abhinav Pathak, Campbell, CA (US); Amit K. Vyas, San Jose, CA (US); Kevin C. Milden, San Jose, CA (US); Hari Gorak, San Jose, CA (US); Anand Ramadurai, Los Gatos, CA (US); Sean Shi, San Jose, CA (US); Drew A. Schmitt, Seattle, WA (US); Michael S. Ferris, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 149 days.

(21) Appl. No.: 17/151,005

(22) Filed: Jan. 15, 2021

(65) Prior Publication Data
US 2021/0141705 A1    May 13, 2021

Related U.S. Application Data

(62) Division of application No. 16/115,127, filed on Aug. 28, 2018, now Pat. No. 10,949,316.
(Continued)

(51) Int. Cl.
G06F 11/30 (2006.01)
G06F 11/34 (2006.01)
G06F 11/36 (2006.01)

(52) U.S. Cl.
CPC ...... *G06F 11/3062* (2013.01); *G06F 11/3075* (2013.01); *G06F 11/3082* (2013.01);
(Continued)

(58) Field of Classification Search
CPC ............ G06F 11/3062; G06F 11/3466; G06F 11/3636; G06F 11/302; G06F 2201/81; G06F 2201/84; G06F 2201/88
See application file for complete search history.

(56) References Cited

U.S. PATENT DOCUMENTS 9,009,539 B1 * 4/2015 Kompotis ............. G06F 11/079
714/38.1
10,013,511 B2 7/2018 Hu et al.
(Continued)

OTHER PUBLICATIONS

"Notice of Allowability," dated Jan. 26, 2021 in U.S. Appl. No. 16/115,127. 8 pages. (copy not provided).
(Continued)

*Primary Examiner* — Manuel L Barbee
(74) *Attorney, Agent, or Firm* — Kilpatrick Townsend & Stockton LLP

(57) ABSTRACT

Embodiments of the present disclosure include methods and systems for generating and processing energy consumption reports received from a plurality of devices. The reports may include a plurality of call stacks captured and stored by remote device as a result of an energy consumption of the corresponding device. For each energy consumption report, the plurality of call stacks may be analyzed to determine a representative call stack of the energy consumption report. The energy consumption reports may be assigned to one or more of a plurality of energy consumption categories based on distances between the representative call stacks of the energy consumption reports and corresponding representative call stacks of the energy consumption categories. A request may be received for energy consumption reports for
(Continued)

a particular energy consumption category. Upon receiving the request, providing a representative set of energy consumption reports assigned to the particular energy consumption category.

20 Claims, 8 Drawing Sheets

Related U.S. Application Data

(60) Provisional application No. 62/679,859, filed on Jun. 3, 2018.

(52) U.S. Cl.
CPC ...... *G06F 11/3466* (2013.01); *G06F 11/3636* (2013.01); *G06F 11/302* (2013.01); *G06F 2201/81* (2013.01); *G06F 2201/84* (2013.01); *G06F 2201/88* (2013.01)

(56) References Cited

U.S. PATENT DOCUMENTS

| | | |
|---|---|---|
| 2003/0191976 A1 | 10/2003 | Cyran et al. |
| 2011/0099433 A1 | 4/2011 | Matsui et al. |
| 2012/0137182 A1* | 5/2012 | Zhang ................. G06F 11/0781 714/48 |
| 2013/0024731 A1* | 1/2013 | Shochat .............. G06F 11/3612 714/38.1 |

OTHER PUBLICATIONS

"Notice of Allowance," dated Nov. 2, 2020 in U.S. Appl. No. 16/115,127. 12 pages. (copy not provided).

* cited by examiner

FIG. 7

DETECTION AND ANALYSIS OF ENERGY CONSUMPTION OF SOFTWARE APPLICATIONS

CROSS-REFERENCE TO RELATED APPLICATIONS

This application is a divisional application of U.S. patent application Ser. No. 16/115,127, filed Aug. 28, 2018 which claims the benefit of and priority to U.S. Provisional Application No. 62/679,859, filed on Jun. 3, 2018 which are hereby incorporated by reference in their entirety for all purposes.

BACKGROUND

Testing distributed or remotely executed software applications is typically done during or immediately after development. Gathering testing and/or diagnostic data from the remote devices that may execute particular software applications is generally not possible. For example, gathering energy consumption data related to particular applications may only be done by testing the remote device while it is physically connected to a diagnostic device. Since this cannot be done for every remote device that may execute a particular application, most testing occurs in a type of clean room environment in which the particular application is tested under environmental conditions that are heavily controlled before being distributed to users. The environment may be modified to gather testing data in conditions that a user is likely to experience, but software developers cannot test every possible variation of environments and/or conditions under which users may execute the particular application. In addition, as software applications grow in complexity and size, it is very difficult and/or cost prohibitive to test every possible code path prior to releasing an application. Therefore, improved methods and systems are needed to improve software testing and diagnostics.

BRIEF SUMMARY

Software applications executing on remote devices may be tested for a variety of purposes. In some examples, applications may be tested to ensure correctness or the absence of fatal errors. In others examples, software applications may be tested to ensure the application does not consume too large of a percentage of a device's resources. This may be especially important for devices that operate remotely with limited power (e.g., operating with only a battery for a power source) or with limited processing resources. Detecting the energy consumption of applications executing on a remote device may enable users to identify how the applications are actually used by users and what code paths are most frequented. The energy consumption information may be used to modify the application to improve its resource utilization which may in turn improve the operation of the remote device.

Energy consumption reports may be generated by a remote device in response to a period of high or unusually high energy consumption. For example, a report may by triggered upon a software application consuming 80% of the central processing unit's (CPU) maximum processing cycles over a specified duration. Upon detecting high energy consumption one or more snapshots of a call stack of the remote device may be stored. A remote device may periodically generate snapshots of the call stack so that a triggering event may capture snapshots that occurred before the triggering event. The one or more of the snapshots may be included in a report that is transmitted to the server.

The server may provide additional processing of energy consumption reports before making the reports accessible to users. The snapshots of the call stacks can include program counters (e.g. a hexadecimal value indicating the position within a program), and symbolification may be used to convert the program counters into a readable form (e.g. an alphanumeric string). The reports may then be signaturized by filtering out portions of the snapshots then identifying a representative portion of the filtered snapshots. The server may identify a category corresponding to similar or matching energy signatures and store the energy signature and report in that storage location. Users may then access the energy signatures associated with a particular application and refine the particular application to improve operation of the particular application and the remote device.

Some embodiments of the present disclosure include methods and systems for generating and processing energy consumption reports from a plurality of remote devices. Energy consumption reports may be received from remote devices over a network. The reports may include a plurality of call stacks captured and stored by remote device as a result of an energy consumption triggering event. For each energy consumption report, the plurality of call stacks may be analyzed to determine one or more representative call stacks. The energy consumption reports may be assigned to a plurality of energy consumption categories based on distances between the representative call stacks of the energy consumption reports and corresponding representative call stacks of the plurality of energy consumption categories. A request may be received for a particular energy consumption category. Upon receiving the request, a representative set of energy consumption reports assigned to the energy consumption category may be provided.

Other embodiments of the present disclosure include methods and systems for generating and transmitting energy consumption reports at a remote device. Monitoring the energy consumption of a computing device over a specified duration may detect a high or unusually high energy consumption. Upon detecting a high or unusually high energy consumption, snapshots of a call stack of the computing device over the specified duration may be stored. Each snapshot of the call stack may include one or more frames that correspond programs that were executing on the computing device. For each unique snapshot, the computing device may identify and count function call paths for programs that have been pushed onto the call stack. A micro-stack may be generated and include the function call paths and the frequency of which each function call path occurred. The micro-stack may be packaged into an energy consumption report and transmitted to a remote device.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIG. 7 is an exemplary graphical user interface depicting an integrated development environment.

Figure 1:
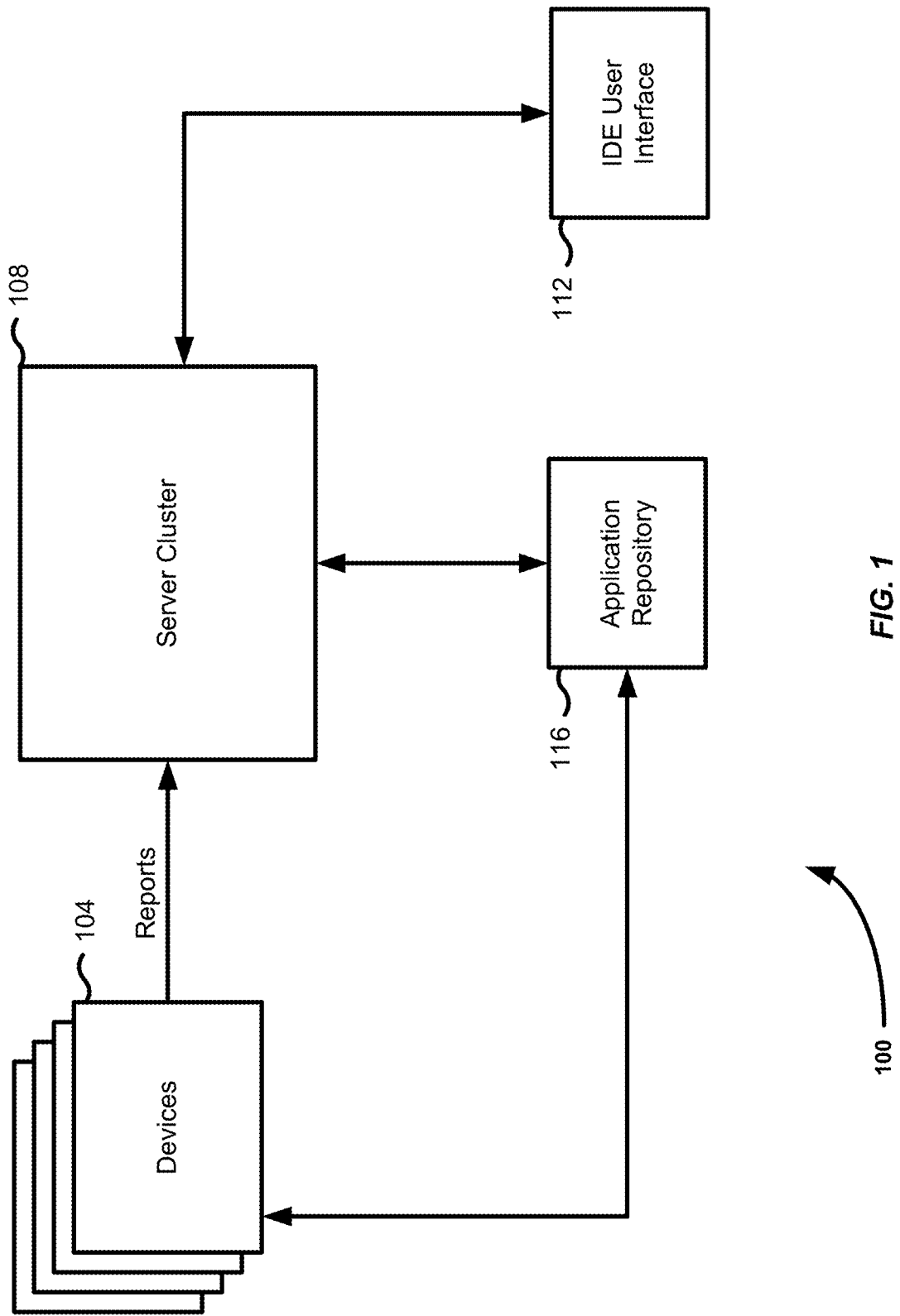
FIG. 1 is an exemplary block diagram of an environment in which energy reports may be acquired.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Mobile devices (e.g., smartphones, tablets, laptops, smartwatches, etc.) operate more applications than those designed by the manufacturer of the mobile device. Third-party application users may develop applications that may be ported or otherwise executed on any number of different hardware and software platforms. For example, an application designed for a smartphone may also be executed on a tablet. As each of the devices have distinct hardware and operating system environments, third-party application users may have to ensure the user experience across both hardware and software platforms is consistent. As used herein the term "user" may refer to an application developer (e.g. a user of an IDE writes source code for an application) and/or a device user (e.g., a user of a computing device executing an application).

Testing applications executed on thousands of remote devices may be accomplished through the same integrated development environment in which the application was developed. While the integrated development environment may be configured to simulate conditions in which users are likely to operate an application, third-party users may not be able to anticipate every possible condition. Third-party users may identify operating conditions of an application executed on a remote user device by accessing program usage information in energy consumption reports that may be captured directly from the remote devices. The reports may identify the conditions users operate an application, identify code paths that are reached, identify the frequency in which parts of an application execute, and the like. Energy consumption reports may be used to improve the development of application designed for multiple platforms, and ensure applications do not consume an excessive amount of the resources of mobile devices.

Energy consumption reports may include snapshots of a call stack of the remote device. The call stack includes a set of frames corresponding to programs executing on the remote device. The frame represent a current function (program) that is executing as well as the function that called it (and the function that called that function, etc.). When a function is called a frame is pushed onto a call stack and when the function terminates the frame is removed from the stack. Each frame may represent a function using a program counter. The program counter may be a hexadecimal value that acts as an address to the instructions of the function.

Each snapshot of a call stack may be represented as a tree-like structure indicating a function call path. For example, a function call path may indicate function A called function B, and function B called function C.

Energy consumption reports may indicate how frequently particular instances of code paths are reached and accordingly how frequently instances of a particular function execute. For example, the reports may indicate that a particular code path appears frequently and coincides with a high CPU load. The code paths may subsequently be modified to reduce the CPU load experienced by that code path. For example, the high CPU load may be mitigated by calling the function from different point in the source code. Once modified, the application may be pushed out to users to improve the operation of the application and the mobile devices in which they operate.

I. Overview of Energy Analysis Environment

FIG. 1 depicts an exemplary block diagram of an environment 100 in which energy reports may be acquired. The environment may include plurality of devices 104 that execute one or more applications. Devices 104 may execute one or more native applications (e.g., applications developed by or in association with a manufacturer of the device) and/or one or more third-party applications (e.g., applications developed by a third-party). Devices 104 may be homogeneous in which each device of devices 104 operates the same hardware and/or software or heterogeneous in which devices may include different hardware configurations and/or software configurations. For example, a first device of devices 104 may be a smartphone executing a first operating system and second device may be executing a different operating system. In another example, a first device of devices 104 may be smartphone and a second device may be a tablet or laptop. Devices 104 may include any combination of computing devices include, but not limited to, smartphone, table, smartwatch, laptop, desktop, field programmable gate array (FPGA), application-specific integrated circuit (e.g. ASIC), microcontroller, and the like.

Devices 104 may include hardware and/or software for detecting an energy consumption of the device. In some examples, energy consumption may be determined based on a current energy consumption, a rate at which a battery is being drained, the difference in battery capacity between a first time and a second time, or the like. In other examples, energy consumption may be inferred and/or calculated based on one or more operating characteristics of the device. For example, energy consumption may be determined based on amount of processing resources (e.g., CPU load, input/output requests, instruction execution latency, and/or the like) being consumed by the device. Upon detecting high or unusually high energy or resource consumption, devices 104 may generate a report.

Energy consumption reports may include one or more snapshots of a call stack captured as a result of detecting a triggering event. Snapshots may be used to indicate an execution frequency of particular functions which may indicate the function causing the high or unusually energy or resource utilization. The call stack may also be used to diagnose one or more errors or faults that exist in the application. For example, the call stack may identify that the application spent too much time executing a single function, which may indicate the presence of a logical fault causing the function to infinitely loop, thereby using excessive energy. The energy consumption reports may include other data associated with the device. For example, energy consumption reports may identify a particular hardware and/or software environment in which the application is executing, conditions present at the time of detecting the high energy or resource consumption (e.g., other applications that were open, memory and/or processor use, etc.), external environment conditions (e.g. temperature of the device), and/or the like.

Devices 104 may transmit energy consumption reports to a server cluster 108 (also referred to as a server computer), which may include a single server or multiple servers in an expandable environment. For example, as storage capacity fills, new servers may be added to the server cluster without modifying how energy consumption reports address the server cluster. Server cluster may receive energy consumption reports from devices 104 and process them to render the data accessible to IDE user interface 112. For example, since reports may be received by a very large number of devices, some of the data may be filtered out while the remaining data is categorized. Server cluster may manage the incoming energy consumption reports and modify the representation of the data to improve data acquisition by an integrated development environment.

Incoming reports may be processed by first identifying one or more representative call stacks. An energy signature may be generated for the one or more representative call stacks. In some examples, signaturization includes filtering portions of the representative stack and preserving only the important frames. For example, a representative call stack for a calculator application may include system level function calls unrelated to the application. The energy signature may include the portions of the call stack associated with the calculator application while excluding the system level function calls.

The server cluster may assign the energy signature to one or more categories by determining a distance between the energy signature and corresponding energy signatures of a plurality of categories. The distance relates to the number of frames that are the same between the energy signature of a current report and signatures of reports in a particular category of energy consumption reports. In some examples, as long as the distance is below a threshold, an energy signature may be considered matching a representative call stack of a particular category (e.g., a statistical match). In other examples, an energy signature may have a distance of zero (e.g., exact match) to a corresponding representative call stack of a particular category to be considered matching. The server cluster may store the energy signature with representative call stacks assigned to the same category.

Integrated development environment (IDE) user interface 112 may be an IDE such as xCode operating on a computing device (or distributed across multiple computing devices). In some examples, the IDE user interface 112 may be a thin client or web application in which users/users access the IDE as it executes on a remote device (such as server cluster 108). IDE user interface 112 may enable development, testing, and updating of applications designed to execute on devices 104. For example, a user of an application may request one or more energy consumption reports related to the application in development from server cluster 108. Server cluster 108 may identify the category and generate a dataset representative of the energy consumption reports and transmit the dataset to the IDE 112. The user may then use the report to provide one or more modifications to the application in development.

Modified applications may be validated by the server cluster prior to distribution to devices 104. Server cluster 108 may provide further compliance verification (e.g., ensuring the application meets requirements of applications in environment 100), testing (e.g., additional application testing based on intended execution environment), and/or the like. For example, server cluster 108 match an application submitted for verification to one or more energy consumption reports related to a previous version of the application. Server cluster 108 may test the application to ensure energy consumption violations and/or a particular high energy consumption event may be mitigated by the new version of the application.

Once verified the application may be passed to application repository 116. Application repository 116 may include one or more server devices that act as network addressable storage cluster. For example, devices 104 and/or users through IDE user interface 112 may access data and/or applications stored in the application repository 116. In some examples, application repository 116 may be part of the server cluster 108. For example, server cluster 108 may include one or more areas of partitioned memory in which application repository 116 may be stored. Application repository 116 may include a collection of applications accessible to devices 104. For example, application repository may enable devices 104 to download free and paid applications. In examples in which the application is a new version of an existing application, devices that have already purchased or downloaded the previous version of the application may automatically download the new version. In other examples, devices 104 and users through IDE user interface 112 may manually access one or more storage locations of application repository 116. With the new version of the application executing of devices 104, the process of generating and processing energy reports may continue in which server cluster 108 may receive energy consumption reports corresponding to the new version of the application.

II. Generating Energy Reports

Figure 2:
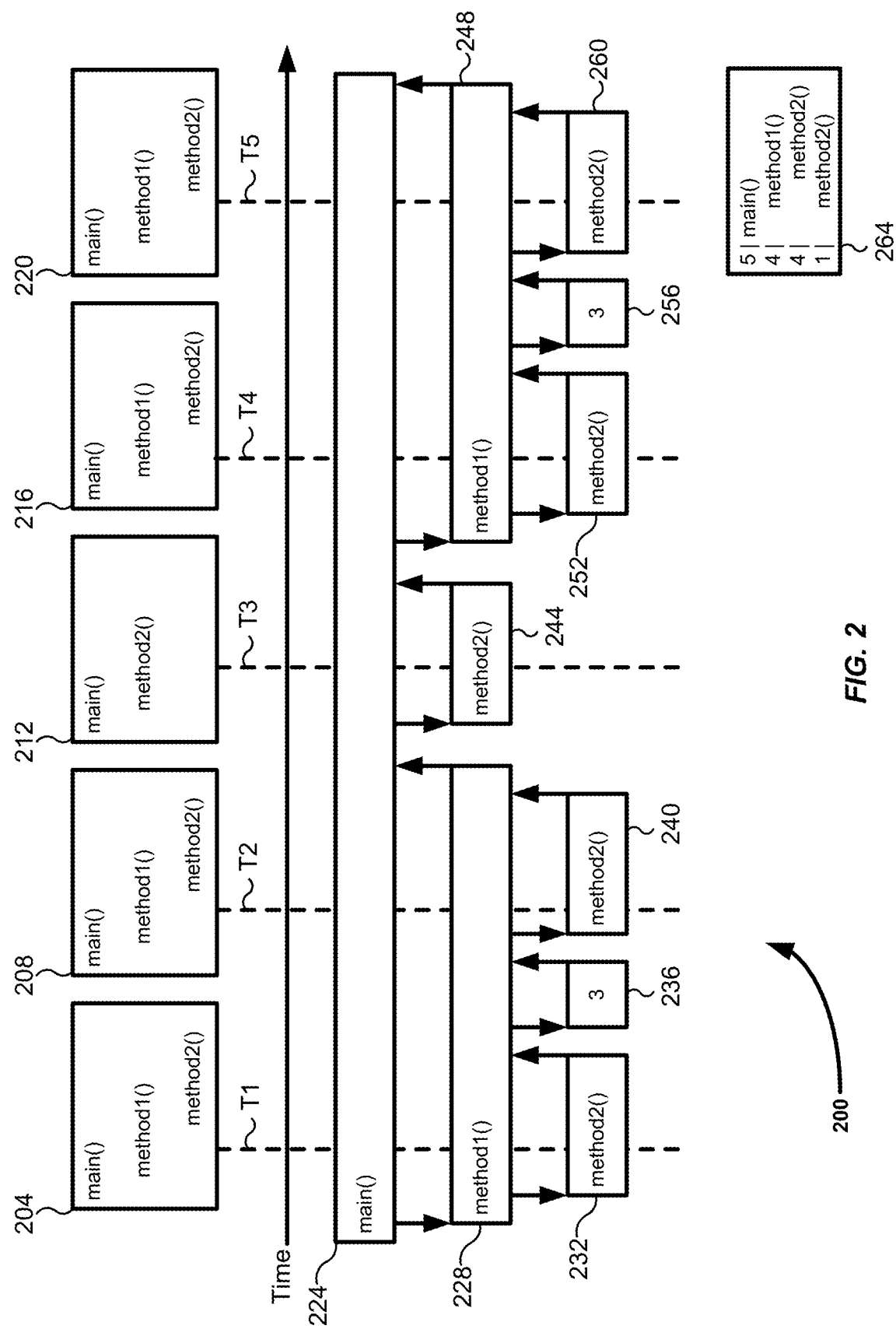
FIG. 2 is an exemplary block diagram of snapshots of a call stack.

FIG. 2 depicts an exemplary block diagram of snapshots 200 of a call stack. A computing device may capture one or more snapshots of the call stack over a period of time. In some examples, snapshots may be captured periodically (e.g., every 30 second, every minute, etc.) over a time interval having a specified duration of time (such as a period of high energy consumption, the duration of an application execution, the duration the device is powered on, indefinitely, or the like). In other examples, snapshots may be captured continuously. Captured snapshots may be stored in response to detecting a triggering event such as detecting a period of high energy or resource consumption. For example, upon detecting a triggering event, the computing may identify one or snapshots captured over a time period associated with the triggering event and store the identified snapshots in an energy report. In that example, if the triggering event was high energy consumption over a period three minutes, the computing device may identify and stored snapshots that were captured over that three minute period.

FIG. 2 depicts five snapshots 204-220 each of which capturing a state of the call stack at a particular moment in time. Snapshot 204 describes three frames (e.g. function calls) that have been pushed onto the call stack at a particular point in time. The function main( ) is a primary function that is the first to execute and from which all functions may be called. The snapshot may organize functions to identify how the functions are called. For example, since method1( ) is called from main( ), method1( ) may be indented to indicate that it was called from main( ). Similarly, method2( ) may be called from method1( ) such that method2( ) may be indented twice to depict the relationship between method1 and method2( ) relative to main( ). In another example (not shown), method1( ) may return an output to main( ) and main( ) may then call method2(directly. In that example, method1( ) and method2( ) may appear with the same level of indentation.

Snapshots 208, 216, and 220 are similar to snapshot 204 and indicate that the state of the call stack (e.g., 204) may reoccur with a relative frequency. For example, capturing multiple snapshots in the example depicted indicates the four instances of the function call path main( ) which called method1( ) which called method2( ) occur. Further, method2( ) is more frequently called from method1( ) then directly from main( ) (e.g., snapshot 212). Snapshots 204-220 may be assembled over the entire time period to describe the larger state of the call stack over the time period while identifying the patterns that may be present, but otherwise lost in the aggregate data.

The snapshots 204-220 describe the state of the call stack at particular instances of time as represented by blocks 224-260. As noted above, main( ) 224 may be a primary function that executes first and from which all other functions may be executed. For example, main( ) 224 may execute the entire length of the execution of an application and only terminate when the application is terminated. Main( ) 224 may call method1( ) 228 which begins executing. Method1( ) 228 may then call method2( ) 232 which begins executing. At time T1, a snapshot is taken in which the state of the call stack may be captured. The snapshot at T1 (e.g., snapshot 204) may be represented as main( )→method1( )→method2( ). As the execution continues, method2( ) may terminate and 3 (236) may be initiated. In some examples, 3 (236) may be a set of instructions, an output, a function, and/or the like. By time T2, 3 (236) had terminated and method2( ) was called again. Snapshot 208, in capturing the state of the call stack at a time T2, does not capture 3 (236), but instead may capture a second instances of the function call path of 204, main( )→method1( )→method2( ).

The frequency in which snapshots are captured may influence the accuracy of the collected data. For example, increasing the frequency in which the snapshots are captured may capture an additional snapshot that includes the state of the call stack during execution of 3 (236) which was not previously represented in snapshots 204-220. However, increasing the frequency may introduce redundant snapshots that require further processing and/or filtering at the server cluster. For example, a snapshot may be captured before method2( ) 232 has terminated. The resulting snapshot would be identical to snapshot 204 and may be filtered out to prevent capturing multiple instances of a same function call path. The frequency in which snapshots are captured may be increased to increase the accuracy of the data collected or decreased to reduce the volume of data requiring processing. In some examples, the frequency may be set by the a user, average function length, average instruction length, an instruction or setting within the application or device, by function call or return (e.g., a snapshot may occur each time the call stack is changed such as when a function call is pushed on the call stack and/or when a function terminates and is popped off the stack), and/or the like.

The execution of the application, and capturing of snapshots, may continue in which method2(240 may terminate passing control back to method1( ) 228 which may then terminate passing control back to main( ) 224. Main( ) 224 may call method2(244 directly. At time T3 a snapshot 212 be captured and be represented as main( )→method2( ). After method2( ) 244 terminates, main( ) 224 may call another instances of method1( ) 248 which may call another instance of method2( ) 252 by time T4. At time T4, snapshot 216 may be represented similarly to snapshots 204 and 208. As the execution continues, method2( ) 253 may terminate and 3 (256) may be initiated. By time T5, 3 (256) has terminated and an instance of method2( ) 260 has been called again. The final snapshot, snapshot 220, may be represented as main( )→method1( )→method2( ). After T5, method2( ) 260 terminates back to method1( ) 248 which terminates back to main( ) 224 and which terminates with the termination of the application.

In some examples, the snapshots may be aggregated to form a snapshot tree data structure including the data of snapshots captured over a specified duration. The aggregated call stack may represent the function call paths from each snapshot along with an indication as to the frequency that a function call path appeared. The tree data structure for snapshots 204-220 may be shown as block 264. Block 264 represents the function call paths in a similar manner as snapshots 204-220 in which each function is represented using indentation to depict a hierarchy. Main( ) 224 may appear as the root node of the tree with a five next to it to indicate it appeared in five snapshots at that particular hierarchy. The function call path main( )→method1( )→method2( ) appeared in four of the snapshots and may appear in the tree in the same hierarchy with a number four next to method1( ) and method2( ). Finally, method2( ) was called directly from main( ) once in snapshot 212, and accordingly, method2( ) may appear in the same hierarchy as method( )1 with a one.

Although described as a tree data structure, the collection of function call paths and frequencies of occurrence may be depicted and/or stored in any possible data structure. For example, the tree may be represented graphically in which main( ) appears as a root node on top and connected to a second layer including method1( ) (228, 248) and method2( ) 244, and method1( ) (228, 248) may be connected to a third layer including method2( ) (232, 240, 252, and 260)). The data represented in block 264 may be represented in any other data structure or format include, but not limited to, a comma separate variable (CSV), alphanumeric string(s), an object, a linked list, and/or the like. While FIG. 2 depicts five snapshots each which having a particular function call path, any number of functions may be called in any number of different configurations. For example, a sixth snapshot may have a hierarchy main( )→method2( )→method4( )→method1( ) which when added to other snapshots in block 264 may appear as:

| | |
|---|---|
| 5 \| | main( ) |
| 4 \| |   method1( ) |
| 4 \| |     method2( ) |
| 2 \| |   method2( ) |
| 1 \| |     method4( ) |
| 1 \| |       method1( ) |

Figure 3:
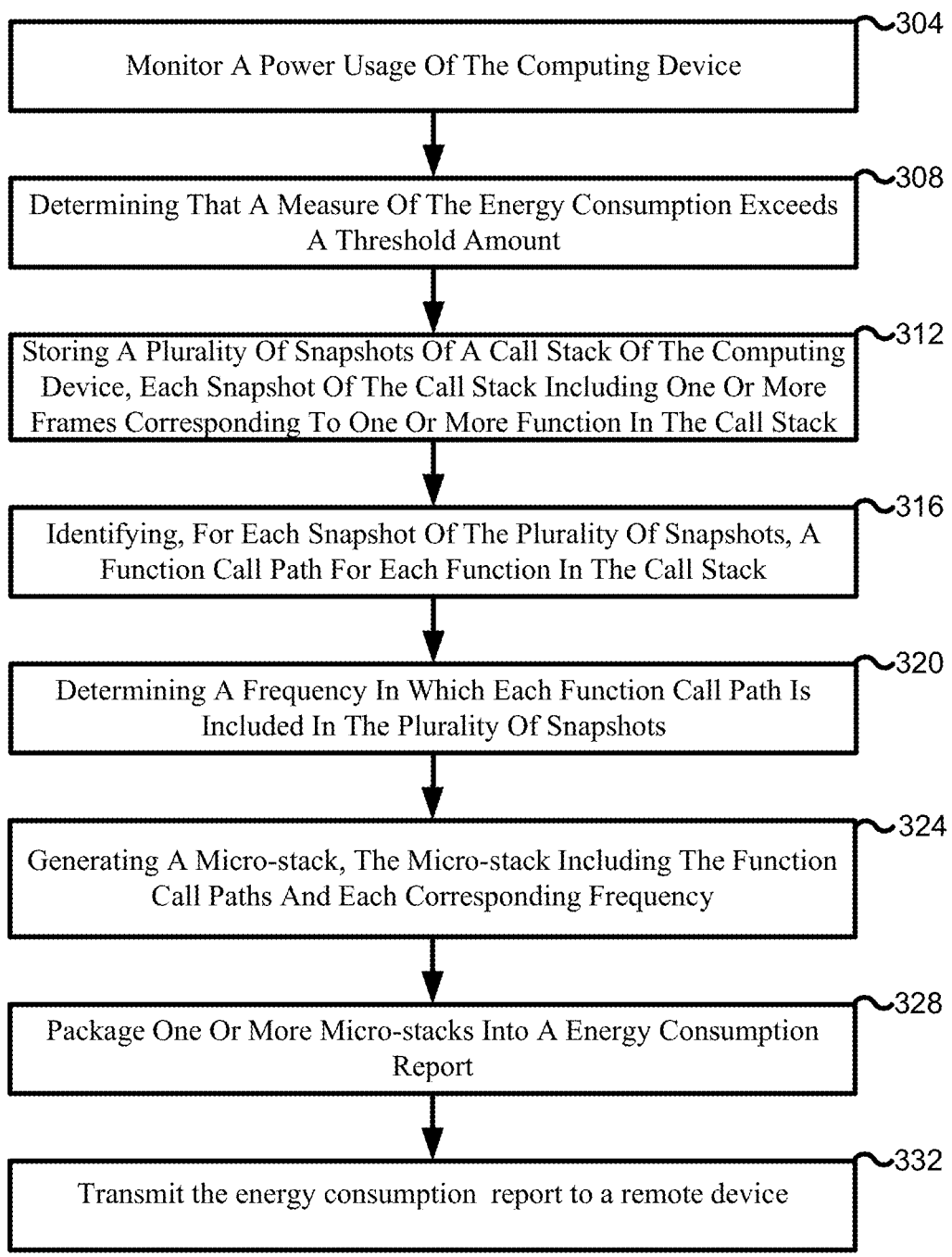
FIG. 3 is an exemplary flowchart describing the generation of energy consumption reports.

FIG. 3 depicts an exemplary flowchart describing the generation of energy consumption reports by computing devices (such as devices 104 of FIG. 1). Computing devices may generate energy consumption reports based on monitoring an energy or resource consumption on the computing device. The energy consumption report may provide an indication as to the cause of high energy or resource consumption by the computing device.

At step 304, a computing device may be monitoring an energy consumption of the computing device. The energy consumption monitoring process may be one or more instructions embedded into an application for which energy consumption is monitored or into an operating system or other system level operating structure (such that energy consumption may be monitored across all applications of a computing device). In some examples, the energy consumption monitoring may directly identify energy usage (e.g., via a battery drain rate), indirectly (e.g., inferred based on an amount of processing resources currently in use), or estimated. For example, the energy consumption may be estimated based on a number of instructions executed over a time period, an amount of time spent executing a portion of the application, number of instructions contained in an application versus other applications, combinations thereof, or the like. In some examples, energy monitoring may occur through a physical circuit that may be either attached to the computing device or embedded therein. In still yet other examples, the energy consumption may be determined remotely. In some examples, the energy consumption may be monitored over a specified duration (e.g., 1 second, 3 minute, etc.)

At step 308, it is determined whether the current energy consumption of the computing device exceeds a threshold. For example, for an application executing on the computing device, the threshold may be set to a percentage (e.g. 50%, 60%, 70%, 80%, 90%, or there between) of the maximum capability of the processor. In some examples, the context of an application executing on the computing device may modify the threshold and/or a specified duration over which the threshold may be exceeded. For example, if an application is executing in the foreground than the specified duration may be three minutes such that if an application is exceeding the energy consumption limit (e.g. 80% of the processor's capability) for three minutes then the threshold has been exceeded (and the processes continues at 312). For another example, the context of an application may be executing in the background in which the specified duration may be set to one minute. In still yet another example, the context may be suspended in which the threshold may be 10% of the processor capability (since the application should be using minimal if any processing cycles) over a period of 30 seconds.

Although the examples described above specify the threshold in terms of processing capability, the context as being one of foreground, background, or suspended, and the duration as being one minute or three minutes, any such threshold, context, and duration criteria may be selected. For example, the threshold may include processing resource such as, but not be limited to, processor use, memory use, input/output queue, RAM/cache use, network communications, combinations thereof, and the like. In some example, the threshold may include processing resources and/or an actual energy consumption metric (e.g., a battery state). In some examples, the particular threshold criteria may be based on the context of the application. For example, for an application executing in the foreground, the processor use may be used, while an application in suspension may use a memory usage. The context of an execution application may include other applications executing on the device. For example, the context may include a context of an operating system or other application executing with a particular application triggering an energy consumption report. The duration may be set to any specified duration and may be based on one or more attributes of the computing device (e.g., processing resources, availability of processing resources, current battery value, battery capacity, and/or the like), application context, operating system, operating system context, threshold selected (e.g. three minutes for a processor use, five minutes for network communication use, etc.), and/or the like. If the threshold is not exceeded over the specified duration, then the process may return to step 304 in which monitoring may continue over a period of another specified duration.

At block 312, one or more snapshots of a call stack of the computing device may be stored. The call stack may be captured periodically such that a triggering event (e.g. exceeding an energy consumption threshold) may trigger storing one or more of the snapshots captured over the specified duration. If the triggering event does not occur then the captured snapshots may be removed after a predetermined period of time. Each snapshot may indicate the state of the call stack at the moment the snapshot was captured. The call stack may include one or more frames where each frame includes a function call according to a function call hierarchy. For example, the snapshot may capture a call stack with three frames in which a main( ) function called method1( ) and method1( ) called method2( ). In some examples, the frequency in which snapshots of the call stack are captured may be modified according to user input, conditions of the computing device (e.g. as energy consumption increases so might the frequency of capturing snapshots of the call stack), conditions of the application, and/or the like.

At step 316, each function call path in a snapshot of the call stack may be identified. A call stack can be a first in last out data structure in which a function (e.g., represented by a frame) is pushed onto the stack when the function is called and removed from the stack when the function terminates. In some examples, a snapshot of a call stack includes one function call path.

At step 320, a frequency in which each function call path is represented in the plurality of snapshots is determined. Since some snapshots (such as snapshots 204 and 208 of FIG. 2) may capture a second (or more) instance of a same function call path, determining a frequency may distinguish function call paths that rarely occur from function call paths may occur often. For example, consider snapshots 204-220 of FIG. 2, snapshots 204, 208, 216, and 220 depict instances of a same function call path that would yield a frequency of four. Snapshot 212 includes a different function call path that is unique and accordingly will be counted once.

At step 324, a micro-stack may be generated for the plurality of snapshots of the call stack. A micro-stack may include each unique function call path found in the plurality of snapshots and the corresponding frequency an indications of how many times each unique function call path was found in the plurality of snapshots. Duplicate instances of each function call path may be excluded from the micro-stack. For example, if two instances of main( )→method1( )→method2( ) were detected from two different snapshots, the result in the micro-stack would be a single instance of main( )→method1( )→method2( ) stored with an integer value of two indicating the frequency. In some examples, the micro-stack may appear in a similar representation as that of block 264 of FIG. 2. In other examples, the micro-stack may be represented in a stack form similar to a call stack, a tree structure, a CSV file, an alphanumeric representation, or any other format that represents the frequency in which function call paths may have been detected.

At step 328, the micro-stack may be packaged into an energy consumption report for transmission to one or more remote devices. The energy consumption report may include additional data and/or metadata collected with the stack snapshots. For example, the energy consumption report may indicate what applications were executing, an operating system type and version, a computing device type and version, a battery type and power level, hardware included in the computing device, an age of the device, a storage capacity and amount of available remaining storage space, an identification of a user of the device, and/or the like. Any type or quantity of additional data may be collected and included in an energy consumption report along with the micro-stack.

At step 332, the energy consumption report may be transmitted to one or more remote devices. In some examples, the energy consumption report may be transmitted to a server cluster for further processing to identify a root cause of the energy consumption (e.g., a particular instruction or function). In other example, the energy consumption report may be stored on the computing device and transmitted through a wired connection at a later time when the computing device comes into proximity to a reader device and/or the server cluster. In still yet other examples, the energy consumption report may be transmitted to two or more remote devices. For example, the energy consumption report may be transmitted to the server cluster for additional processing and directly to a user or other user that may be interested in the data contained in the energy consumption report. In any of the above examples, a copy of the energy consumption report may be retained by the computing device. The computing device may store past energy consumption reports so that the user of the computing device, an administrator, a user, and/or the like may access the energy consumption reports such as when transmission fails or the data is otherwise corrupted in transit.

Once the report may be transmitted, the process may return to step 304 in which energy monitoring may resume. In some examples, the steps 304-340 represent and continuous set of events in which energy monitoring at step 304 never ceases. In those examples, steps 304 and 308 may execute even while one or more snapshots are being processed steps 312-340. The steps may continue indefinitely until the computing devices receive user input terminate the process, the computing devices is switched, and/or upon receipt of a remote instruction. In other examples, the steps 304-340 may execute once and upon the transmission of an energy consumption report, the process may terminate.

III. Processing Energy Reports

Millions of energy consumption reports may be received from computing devices. A server cluster may process the income energy consumption reports to manage the large volume of reports and enable a user of an integrated development environment the ability to identify energy consumption reports that correspond to a particular category. For example, the server cluster may generate an energy signature for each report and use the energy signature to classify the report according to a category with a similar or matching energy signature. A user may also use an energy signature as a query to identify energy consumption reports that may correspond to a particular energy signature. A user may use the reports to identify one or more locations with an application which may be the cause of high energy or resource consumption.

A. Data flow

Figure 4:
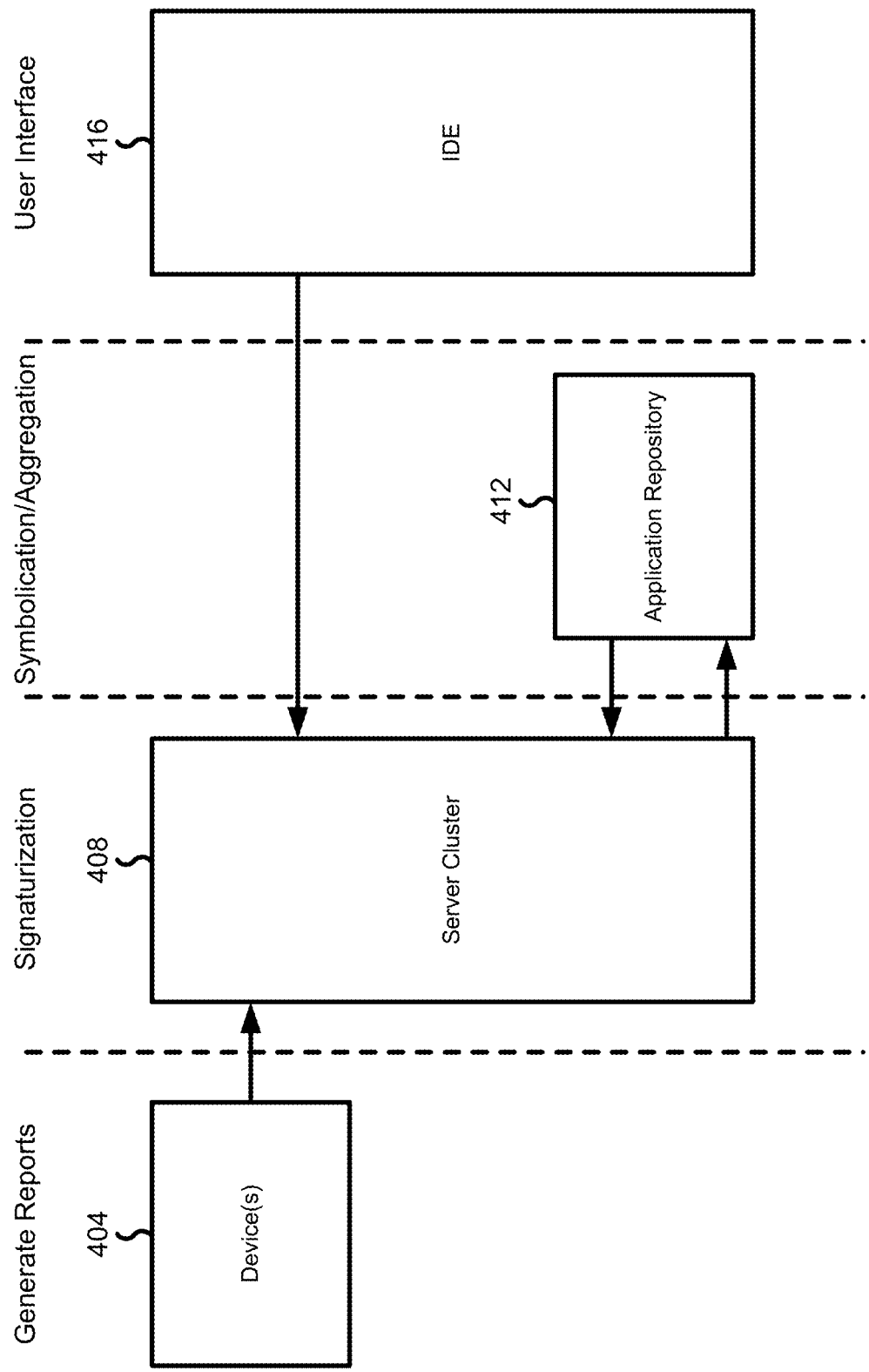
FIG. 4 is an exemplary block diagram of an environment in which energy reports may be processed for use by an integrated development environment.

FIG. 4 depicts exemplary block diagram of an environment 400 in which energy reports may be processed for use by an integrated development environment. Devices 404 may be local or remote devices that execute one or more applications. In some examples, devices 404 may operate on battery power in which a user of one or more of the application executing on devices 104 may gather data on how the execution of one or more applications may affect the energy consumption of devices 404. In other examples, devices 404 may include both battery powered and non-battery powered devices such that reports may indicate to one or more users the energy efficiency of one or more applications (including an operating system) executing on devices 404 and/or devices 404.

Energy consumption reports generated by devices 404 are transmitted to server cluster 408 in which the reports may be processed. Server cluster 408 may generate an energy signature from a plurality of snapshots included in each energy consumption report. The energy signature includes may be a call stack of the plurality of call stacks that occurs the most frequently which may indicate a cause of high or unusually high energy consumption by a device of devices 404. The energy signatures may be a representative stack of the energy consumption report and used to identify other energy consumption reports that have matching causes (e.g., similar representative stacks). For example, a signature may be categorized based on the distance between the energy signature and an energy signature corresponding to a particular category. The distance may be based on a number of frames of the energy signature being different from the energy signature corresponding to the particular category. If the distance is below a threshold, then the energy signature may be considered a match and may be assigned to that particular category.

The threshold distance that may determine whether two energy signatures match may be fixed or variable. For example, the threshold distance may be set by user input, based on one or more energy consumption reports, and/or the like. In some examples, matching energy signatures must have a distance of zero (e.g. an exact match). Any number of categories may exist and be based on a particular energy signature and/or based on one or more other criteria such as, but not limited to, application associated with the energy signature, energy consumption report, context of an application (e.g., foreground, background, etc.), computing device type or version, and/or any other data that may be relevant to an energy signature or energy consumption report. In some example, an energy signature may be assigned to more than one category based on matching any of the criteria described above or any other criteria.

Application repository 412 may receive the energy signature energy consumption report from server cluster 408. Application repository 412 may store applications developed via IDE 416 and made available to devices 404. For example, application repository enable devices 404 to select and download applications for execution on devices 404. Once an application stored in application repository 412 is updated to a new version, devices 404 may automatically request or otherwise receive the updated application. Application repository may also include other data associated with applications stored in the repository. For example, application repository 412 may store source code syntax, program codes, or semantics of a corresponding application, metadata (number of downloads, version history, version date, user information, etc.), energy consumption reports (e.g., organized by categorized energy signatures), and/or the like.

Energy signatures and energy consumption reports received from server cluster 408 may be subject to symbolification and aggregation. Application repository may convert the stack signature to a symbolic form using the syntax and semantics of an application that corresponds to the energy signature. Since call stack frames represent function calls by a program counter address in an n-bit hexadecimal value (where n is equal to 32-bits, 64-bits, or any other base two number of bits), they are generally not readable by a user. In other words, a user likely would not be able to identify which hexadecimal value represents which particular function in the source code of the application. Symbolification converts the hexadecimal program counter to the identifiers (e.g. function name) used by the source code (e.g., by using the stored semantic, program codes, and/or syntax). Once converted the energy signature and corresponding energy consumption report may be aggregated with other energy signatures and energy consumption reports having a same assigned category.

In some examples, symbolification may occur before signaturization. In those examples, the energy consumption reports may be received by server cluster 408 which passes the reports to the application repository 412 for symbolification. The entire report may be converted to a symbolic form which may then be transmitted back to the server cluster 408. Server cluster 408 may generate the energy signature from the symbolic form of the energy consumption report. The energy signature and energy consumption report may be returned to application repository 412 for aggregation (e.g., identifying a similar or matching assigned category and storage with other energy signatures and reports having the same energy consumption category). In other examples, the server cluster 408 and application repository 412 may be the same device performing separate processing tasks. For example, application repository may be a partition of the server cluster 408. Although processing may occur in separate portions of the server cluster, the same or similar hardware may provide both the symbolification and signaturization regardless of the order in which either process occurs.

Integrated development environment (IDE) 416 may be an environment in which one or more applications may be developed. IDEs may include a text based editor, one or more compilers (e.g., based on a programming language being compiled), a debugger, and/or other features. A user may improve an application previously submitted to application repository 412, by using energy consumption reports generated from devices 404 that may have executed the application. IDE 416 may request an energy consumption report and/or energy signature from server cluster 408 which may obtain the data from application repository 412. IDE 416 may present a graphical user interface to enable a user to view the reports and energy signatures. In some examples, the number of reports for a given application and/or energy signature may be too large to provide meaningful feedback to a user. In those examples, server cluster 408 may make the data available, but initially pass a smaller representative dataset (e.g., the most recent set of energy consumption reports). The user may request additional data as needed. The representative dataset may indicate one or more functions in which the application spends the most time executing which may indicate the cause of a high or unusually high energy consumption. The user may use IDE 416 to modify the application and transmit a new version to application repository 412.

B. Signaturization

Figure 5:
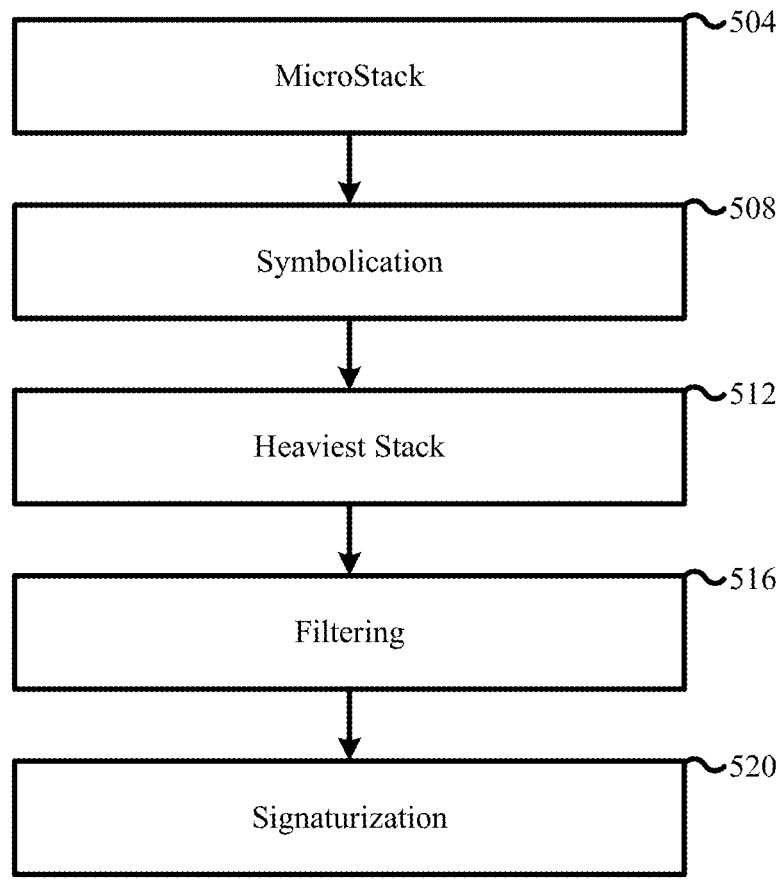
FIG. 5 is an exemplary flowchart of the symbolification and signaturization of energy consumption reports.

FIG. 5 depicts an exemplary flowchart of a process for symbolification and signaturization of energy consumption reports.

At step 504, a micro-stack may be received by a computing device (e.g., server cluster 408 of FIG. 4). The micro-stack may be an aggregated call stack that represents the functions call paths of a plurality of snapshots of a call stack of the computing device. The micro-stack may represent the function call paths as a hierarchy of function call paths based on the frequency in which each function call path occurred. The micro-stack may also include the frequency in which instances of each function call paths appeared in the snapshots of the call stack. In some examples, the micro-stack may include metadata with attributes associated with the micro-stack. For example, the metadata may include details of the computing device from which the micro-stack was transmitted from and/or any other data that may relevant to an application, a user, or the micro-stack.

At step 508, the data within the micro-stack may be converted to a symbolic form (e.g. alphanumeric strings). The micro-stack may include one or more frames that represent function calls of a corresponding application. Frames represent function calls using a program counter as an address as a 64-bit hexadecimal value. Symbolification may identify a particular version of an application corresponding to a micro-stack by identifying one or more frames in the micro-stack or by identifying other data in the corresponding energy consumption report. Once the particular version of the application is identified, source code information associated with that particular version of the application may be analyzed. Each program counter (e.g., function call) may be replaced with an alphanumeric string that represents a name of a function assigned to that function by a user. For example, a program counter may represent a function call as the following 64-bit hexadecimal value: FA02 C7B2 09D4 156E. The 64-bit hexadecimal value may be converted to the name of that function such as, by example, helloWorld( ).

In some examples, the symbolification may occur automatically using application specific data (e.g., syntax and semantic source code data) received from a user. For example, upon identification of the particular version of the application, the application specific data may be automatically accessed and used to perform symbolification. In other examples, a user may supply a conversion table (e.g., a program counter to function name data set), manually convert the data, provide instructions which when executed perform some or all of the conversion, and/or the like. In still yet other examples, two or more of the above may be used in combination. For example, some of the programming counters may be automatically converted, while others be converted based on additional user input.

At step 512, the heaviest branch from the micro-stack may be identified. The heaviest branch may be the most frequently occurring function call path in the micro-stack. For example, the heaviest branch of a micro-stack such as block 264 of FIG. 2 would be main( )→method1( )→method2( ) because it appears more often than other branches. In some examples, the most frequency occurring function may indicate the heaviest branch even if the entire function call path is not the most frequently occurring. In still yet other examples, other criteria may be used alone or in combination with the most frequently occurring branch. For example, the criteria may include function execution time (e.g., a same instance of a function appearing in two snapshots may indicate a long execution time), function size, percentage of instructions and/or number of instructions executed by a function or function call path, and/or the like.

At step 516, the heaviest branch may be filtered to eliminate redundant, irrelevant, or excessive data. Filtering may reduce the heaviest branch so that it includes only the most relevant data to the energy consumption of a particular application. For example, a white list and a black list may be used to determine, on a frame-by-frame basis, whether a frame of the heaviest branch of the micro-stack should be removed. If a frame matches an item in the black list then that frame may be removed. The black list may include data associated with operating system function calls, private or privileged function calls, function calls associated with other applications than the application subject to the energy consumption report, and/or the like. For example, the black list may remove a function call to another application for which the energy consumption report and/or the cause of the energy consumption may not be relevant. The black list may further remove data corresponding to irrelevant function calls such as function calls associated with an operating system or with another entity that is outside the particular application. The black list may also remove data corresponding to privileged and/or sensitive information for which the manufacturer of the computing device may not want to be identified or distributed to a third-party user. By contrast, items on the white list may include functions associated with the particular application, public functions related to, but external to, the particular application, and/or the like that may be relevant to the energy consumption of the particular application.

Once the white list and the black list are applied the heaviest branch may be further filtered by removing identical adjacent frames (i.e., duplicate frames). In some examples, the heaviest branch may include multiple frames indicate the same or similar function call path. For example, main( )→method1( ) may appear twice implying either that main( ) called two different instances of the same function or that the same function was still executing across multiple snapshots. The identical adjacent frames may be removed from the heaviest branch preserving an instance of the frame in the heaviest branch without polluting the heaviest branch with too much information.

At step 520 an energy signature may be generated from the filtered heaviest branch. The energy signature may include a particular portion of the heaviest branch based on the amount of time, frequency, and/or any other criteria relevant to other functions of the heaviest branch. The process of generating a signature may begin by assigning a value to each layer of the function call path represented by the heaviest branch. Each frame may be assigned a weight or percentage based on an a criteria of the application (e.g., execution time, frequency, function size, memory usage, processor usage, any of the criteria described above with respect to any other figure, and/or the like). The weight or percentage may indicate an amount of a resource consumed by that function to provide a comparable energy consumption metric relative to other functions of the heaviest branch.

For example, given the call stack of block 264 of FIG. 2, main( )→method1( )→method2( ) may be selected as the heaviest branch. Four instances of method2( ) execute within the heaviest branch. Roughly 60% of execution time (or other relevant criteria described above) of the branch may occur through execution of a method2( ) function. Moving to the second layer, two instances of method1( ) execute. The percentage assigned to method1( ) may be determined by adding the percentage of execution time spent by functions called from method1( ) to the time spent executing method1( ). Method1( ) may be assigned 20% which may be added to the 60% of the time spent executing method2( ) to indicate a total of 80% of the heaviest branch is spent executing method1( ). Main( ) may have a percentage of 100% based on the percentage assigned to method1( ) added to a percentage spent in execution of main( ), for example 20%. In some examples, main( ) being the root node of the heaviest branch may always be assigned 100% as the entire execution of the heaviest branch involved the execution of main( ).

While the above example describes the heaviest branch as having only three layers, a heaviest branch may have any number of layers. In addition, a given function may be assigned percentages that may be any number between 1% to 100%. In some examples, the percentage may not be assigned an integer value but include a decimal such as 1.1%, 1.01%, etc. based on the calculated time spent executing that function and functions called by that function if any. In some example, another value may be substituted for a percentage such as weight, other value (numerical, alphabetical, or alphanumerical), and/or any other means for indicating a relative importance of each level of the heaviest branch relative to a particular criteria (e.g., execution time, memory usage, instruction size, function size, and/or any other criteria mentioned above) associated with energy consumption.

An energy signature may be generated for the heaviest branch by identifying the percentage (or other metric used) at each layer of the heaviest branch. The amount of the heaviest stack included in the energy signature may be based on a threshold value N. The threshold value N may be selected either automatically, via an analysis of the heaviest branch and/or the entire micro-stack, via user input, and/or the like. In some examples, the analysis may begin at the root node (e.g. main( ) from the example above) of the heaviest branch and add each frame to the energy signature until the percentage (or other metric) falls below N. For example, if N were set to 70%, then in the example above, main( ) and method1( ) would be added to the energy signature as the percentage of main( ) was 100% and the percentage of method1( ) was 80%. Method2( ) would be not be added to the stack signature as this layer of the heaviest branch was below N.

In some examples, the energy signature may include a particular amount of data. For example, the energy signature may include three to five frames. In those examples, frames may be added until the minimum or maximum is reached even though the percentage may no longer meet the threshold or that other frames may match the threshold. In the example described above method2( ) may be added to get to three frames even though method2( ) does not meet the threshold of 70%. In another example, if five frames have been added to the energy signature, then a sixth frame which may still exceed the threshold may not be added. In some examples, the minimum and maximum number of frames may be modified based on an analysis of the source code, application, energy consumption report, heaviest branch, and/or the like or by user input. In still yet other examples, the process may be reversed in which the leaf node (e.g., the bottom most layer or method2( ) from the example above) may be the starting point for the threshold analysis. In those examples, the process may work up until the threshold N is exceeded.

Once the frames have been added to the energy signature, the frames may be concatenated to present a single frame and/or data point. For example, if the energy signature include three frames main( ), method1( ), and method2( ), the energy signature may be represented as the single string "main( )method1( )method2( )" after concatenation. In some examples, the concatenation may use something other than the function name such as an abbreviated form or some other representation of the function name. For example, the energy signature of the above example, may be simplified to an alphabetical representation using letters to represent an order in which a frame appeared in the heaviest branch or energy consumption report. For that example, ABC may be the representation of the energy signature, where A refers to main( ), B refers to method1, and C refers to method2( ). The energy signature may be a single numerical, alphabetical, or alphanumerical string. The energy signature may be compared to other energy signatures to provide an indication of an energy consumption report similarity without having to compare multiple data points, or potentially, disparate data types.

C. Flowchart

Figure 6:
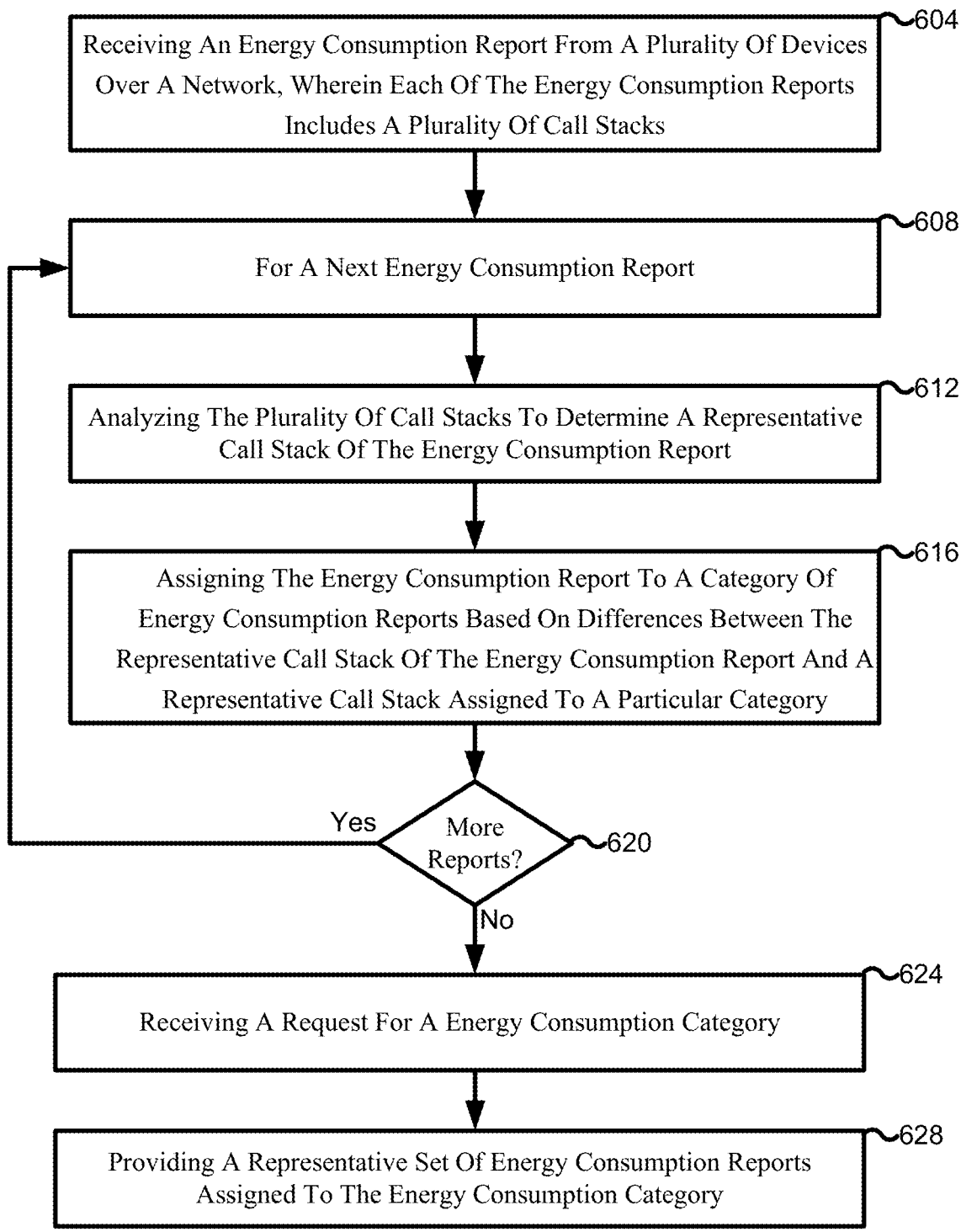
FIG. 6 is an exemplary flowchart of processing energy consumption reports.

FIG. 6 depicts an exemplary flowchart of processing energy consumption reports from one or more devices generated as a result of an energy consumption event.

At step 604 one or more energy consumption reports may be received from a plurality of devices. The reports may be received based on a triggering event occurring at a device of the plurality devices. The triggering event may be an amount of one or more processing resources used over a specified duration. For example, for an application executing in the foreground, the triggering event may be 80% of the CPU's capability being in use for 3 minutes. For another example, for an application executing in the background, the triggering event may be 80% of the CPU's capability being in use for 1 minute. Any such criteria (e.g. processing resources), threshold (percentage in use), and duration may be selected to form a triggering condition. In some examples, multiple reports may be received from a single device based on a triggering event occurring more than once. In other examples, one report may be received from one device and a subsequent report may not be received until a time period has expired or until some other condition is met. Each energy consumption report may include one or more call stacks, each of which include one or more frames associated with a particular application associated with the triggering event.

At step 608, a first energy consumption report may be selected for processing.

At step 612, the energy consumption report may be analyzed to derive a representative call stack from the call stacks in the energy consumption report. In some examples, the representative call stack may be one of the one or more call stacks of the energy consumption report. In other examples, the representative call stack may be a micro-stack (e.g., according to FIG. 2-3 and 5 for example). In other examples, the stack that appears with the highest frequency among the call stacks of the energy consumption report may be selected as the representatives call stack. In still yet other examples, the representative call stack may be a combination or selected portions of the one or more call stacks of an energy consumption report. For example, the representative call stack may be the call stack with the most frequently occurring function call path across the one or more call stacks. Other such criteria may be used to define a representative call stack such as function call path frequency, function frequency, execution time relative to a function, resource consumed by a function or function call path, and/or the like.

In some examples, symbolification and signaturization may be performed on the representative call stack before the process moves to step 616. Symbolification may convert the raw program counter data (e.g., an n-bit hexadecimal value) to a symbolic form that uses the function names of the application source code. Signaturization may convert the representative call stack to an energy signature in which redundant, irrelevant, and/or sensitive call stack data may be removed. In addition, the energy signature may include only a portion of the representative call stack (e.g. three to five frames). For example, after filtering out the redundant, irrelevant, and/or sensitive data, signaturization may identify a heaviest branch of the representative call stack and prune that branch such that only the top few frames from the heaviest branch may be included in the energy signature. These frames may be further concatenated to include a single data point to compare the energy consumption reports.

At step, 616, the energy signature may be assigned to one or more of a plurality of categories of energy consumption reports. In some examples, categories may be based on particular energy signatures to create a granular review of similar energy consumption causes. For example, categories may be generated based on a particular energy signature appearing over a threshold amount indicating a statistical association between the call stack of the energy consumption report and a cause of a high or unusually high energy consumption. Thus, if an energy signature appears with a sufficient frequency, a new category matching that energy signature may be generated and matching energy signatures may be stored according to that category.

In other examples, a category may be assigned based on a distance between energy signature of a current report and an energy signature assigned to a category, where the distance is determined by comparing the frames of each signature. A category of energy consumption reports may include a group of energy consumption reports assigned to the category. For example, a statistical matching may be performed such as principle component analysis (PCA) or the like. If the distance is below a threshold amount (e.g., the two energy signatures being sufficiently similar) than the energy signatures may be considered matching and the energy signature may be assigned to that particular category. In some examples, the threshold amount may be set to zero such that each energy signature must exactly match a corresponding energy signature from a category to be assigned to that category. Once assigned to one or more categories, the energy signature and energy consumption report, may be stored with other energy signatures and energy consumption reports that share the same category.

In still yet other examples, a category may be assigned based on a distance between a plurality of call stacks of an energy consumption report and corresponding plurality of call stacks assigned to the category. The distance may be determined based on the individual distances between each call stack of the energy consumption report and a corresponding call stack assigned to the category. For examples, frames of each call stack of the energy consumption report may be compared to the frames of a corresponding call stack assigned the category to determine a distance. The distance between the plurality of call stacks of the energy consumption report and the call stacks assigned to the category can be determined by adding or averaging the individual distances between each call stack. In some examples, the energy consumption report may be assigned to the particular category based on distances between a percentage of the call stacks of the energy consumption report and a corresponding percentage of call stacks assigned to the particular category being less than a threshold.

At step 620, it is determined whether there are any additional energy consumption reports to process. If there are more energy consumption reports then the process may return to step 608 in which a next energy consumption report may be selected. In some examples, the process may move to both 608 to continue processing energy consumption reports and to step 624 to process a request for one or more particular energy consumption reports. In other examples, absent a request for a particular one or more energy consumption reports at 624, the process may return to 604 or 608 and wait until another energy consumption report is received for processing. If there are no more reports to process and/or a request has been received the process may move to step 624.

At step 624, a request for one or more energy consumption reports may be received. The request may include a particular one or more energy consumption reports or a query to identify one or more matching energy consumption reports. In some examples, the request may include a representative call stack (or energy signature) as query and one or more matching representative call stacks (or energy signatures) or categories may be identified and included in the providing step 628. In other examples, the request may include a category or a description of a category and a representative call stack (or energy signature) or a set of energy consumption reports matching the category may be provided to the requester.

At step 628, the energy consumption report and/or representative call stacks may be provided to the requestor. As categories may include anywhere from zero to millions of energy consumption reports, rather than returning each energy consumption report matching the query or request, a sample set of energy consumption reports may be provided. For example, the sample may be an accurate representation of the remaining energy consumption reports based on one or more criteria of accuracy. A user interface (e.g., see FIG. 7 described below) may present the sample set of energy consumption reports with a button or other actionable item to enable a user to select or otherwise obtain one or more additional reports of the category. In other examples, one or more randomly selected energy consumption reports, a user/requestor selected, a statistical cross-section, and/or the like may be used to be provide reports to the requestor. In some examples, steps 624-628 may represent a parallel process in which steps 604-620 continuously execute and steps 624-628 execute in parallel upon receiving a request. In other examples, upon completing the request the process may repeat or terminate.

IV. User Interface

Figure 7:
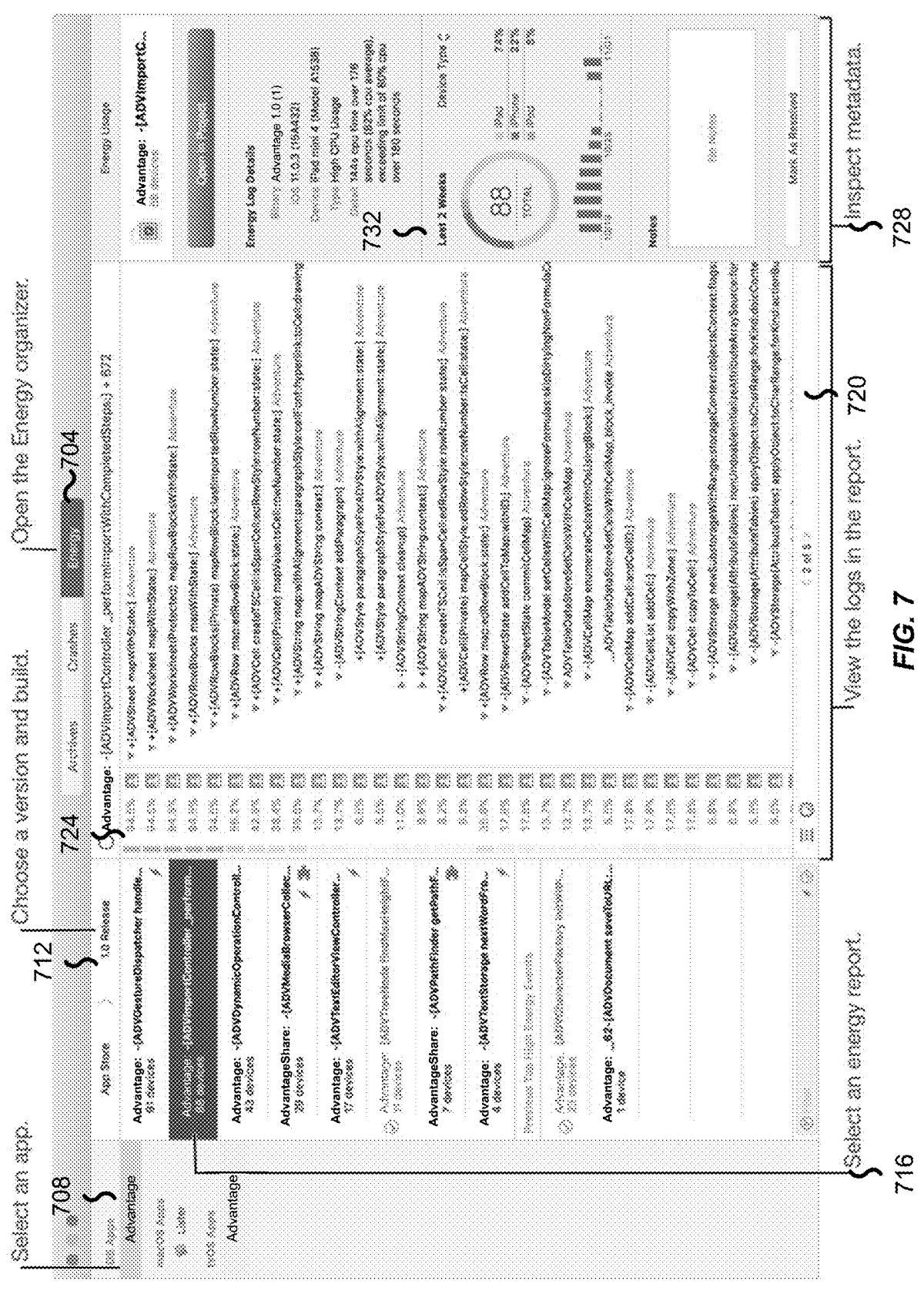

FIG. 7 depicts an exemplary graphical user interface that may be provided to a requesting computer such as a device operating an integrated development environment (IDE) that accesses energy consumption reports. A user of the IDE may program an application for one or more devices using an editor of the IDE. Completed applications may be distributed to one or more devices for execution. During execution, the application may trigger the generation of an energy consumption report that may be analyzed using the IDE to correct or otherwise improve the energy consumption of the application. Button 704 enables a user to navigate between different report type presentations. The button currently selected is the energy button which presents user with options to select and view energy consumption reports generated by one or more devices executing a particular application.

At 708 is a list view of multiple applications that may be selected. Reports may exist for each application enabling a user to switch between one or more applications that may be in development. The Advantage application is currently selected. At 712, the particular version of the application may be selected. Energy consumption reports may be specific to a particular version of a particular application. Reports for past versions may be preserved to enable viewing energy consumption reports corresponding to one or more previous versions of the application. Below the version selection area is an energy consumption report selection area 716. This area may be a list view of one or more categories of energy consumption reports that is associated with the particular version (e.g., version 1.0) of the particular application (e.g., Advantage). Each of the categories may be identified by a representative call stack or energy signature and additionally indicate a volume (e.g., number of reports in the category) and an indication of the number of devices from which the reports have been generated. For example, the category that is selected indicates 88 devices generated reports for that category. In some examples, the upper portion of the list view of 716 may display the reports most recently received over a given period (e.g., the past two weeks, month, etc.). Older reports may be viewed further down in the list view.

The view 720 may include logs (e.g., reports) that may be stored within the selected category. Each report may be selected and expanded to identify other function calls captured by an energy consumption report. The sidebar 724, indicates the percentage of processing resources spent in the function sharing the same line. For example, the function ADVSheet mapWithState consumed 94.5% of the resources in that report. Selecting the triangle may expand the function to indicate functions called by ADVSheet mapWithState and the amount of resources spent in those functions. The percentage of each function may be determined based on the processing resources used by the function plus the processing resources of each function called by that function. Selecting a function may bring up the application's source code at the location of the particular function (e.g., at the function call or at the function's declaration) to enable review or modification of the particular instructions corresponding to the energy consumption report. At the bottom of the screen is a page indicator allowing the view 720 to switch to a different page in which another set of energy reports may be presented.

The right hand section 728-732 presents additional aggregated details of the energy consumption reports. At 732 a selection may be made to inspect the metadata associated with a particular energy report and/or category. The metadata may include details of the devices, application, energy consumption reports, category, and/or the like. At 732, one or more additional details including a graph of the recent energy consumption category may be displayed. The additional details may be device specific indicating the application, version of the application, device that generated the energy consumption report, the type of energy consumption report (e.g., high or unusually high CPU use, memory use, execution time, etc.), and/or the data corresponding to the type of report such as the triggering condition. For example, the data may indicate the specific conditions (e.g., 80% of the CPU in use for over 176 second) that caused a particular report to generate.

A chart may also be displayed indicating the number of devices transmitted a report, the types of reports generated, the severity of the reports, the device types (e.g., smartphone, tablet, smart watch, laptop, etc.) that transmitted a report, etc. In addition, a bar chart may also be displayed describing the volume of the reports received over time. The time span may be selected by a user or automatic based on a report category. Although only two graphs are depicted, any graph type may be used to graphically depict the information presented in the reports. In addition, any number of graphs may be displayed such that additional graphs may either be represented smaller (to fit in the space) or the graph presentation area may be enlarged to fit the additional graphs.

While the description and representation of the graphical user interface of FIG. 7 includes specific features depicted in a particular orientation, the representation of any features, text, data, and/or the like may be altered without departing from the spirit or scope of the present disclosure. For example, the category section 712 may represent the data in list or in any other manner such as, but not limited to, a tree, a set of graphical images, a drop down menu, a search box (e.g., to enter a query for a category and/or report), and/or any other manner in which text may be organized or displayed. Further the orientation of the data presented in the window may be rearranged such that the graphs 732 may be moved to the application selection section 708 or to any other section. Accordingly, the graphical user interface of FIG. 7 represents only one possible depiction of the data presented in a user interface. Numerous other variations and possibilities exists such that any particular feature of the graphical user interface may be altered to present the data in a similar or drastically different manner without departing from the spirit or the scope of the present disclosure.

V. Exemplary Devices

Figure 8:
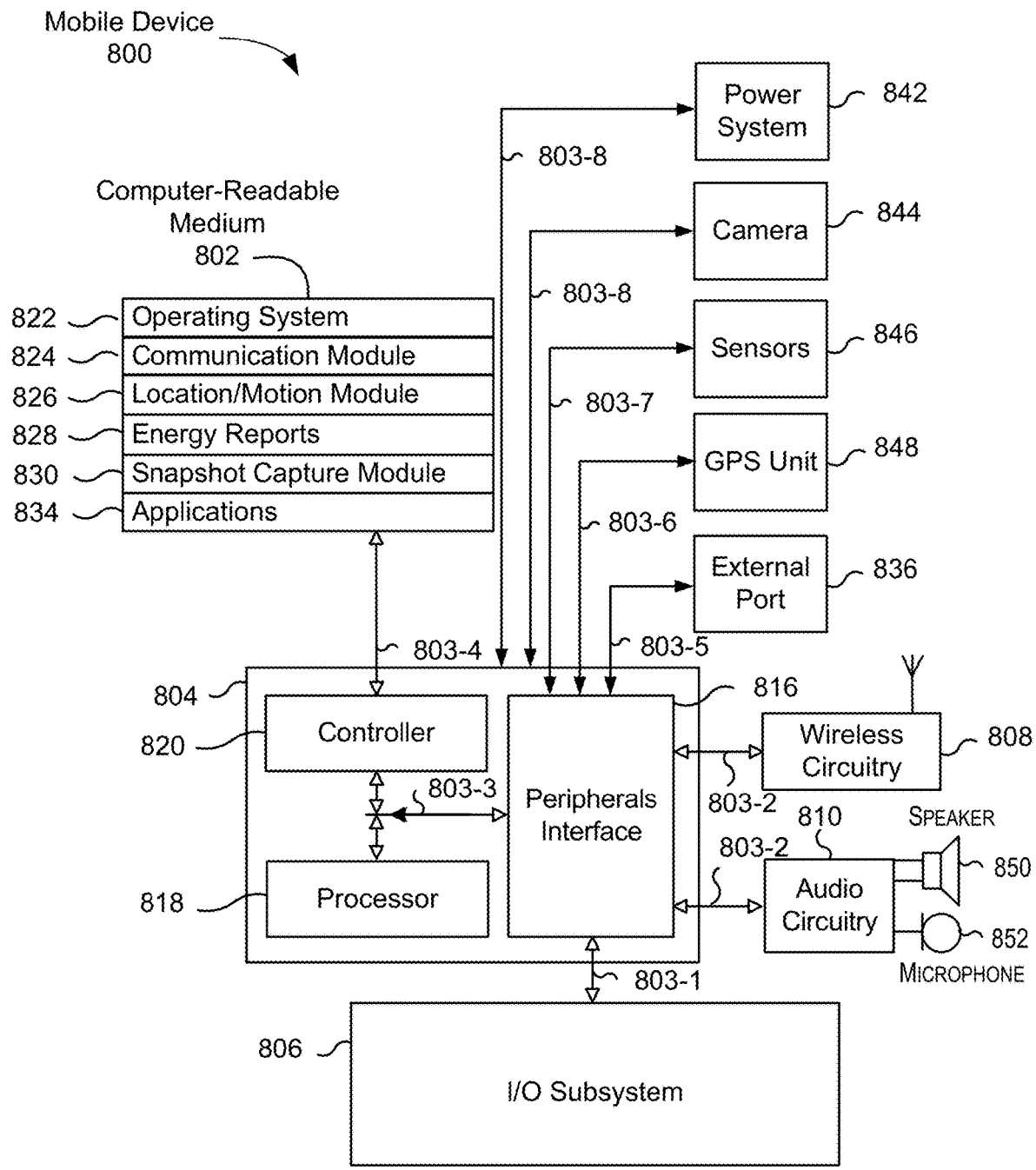
FIG. 8 is a block diagram of an example device according to embodiments of the present invention.

FIG. 8 is a block diagram of an example device 800, which may be a mobile device. Device 1200 generally includes computer-readable medium 802, a processing system 804, an Input/Output (I/O) subsystem 806, wireless circuitry 808, and audio circuitry 810 including speaker 850 and microphone 852. These components may be coupled by one or more communication buses or signal lines 803. Device 800 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 8 is only one example of an architecture for device 800, and that device 800 can have more or fewer components than shown, or a different configuration of components. The various components shown in FIG. 8 can be implemented in hardware, software, or a combination of both hardware and software, including one or more signal processing and/or application specific integrated circuits.

Wireless circuitry 808 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 808 can use various protocols, e.g., as described herein.

Wireless circuitry 808 is coupled to processing system 804 via peripherals interface 816. Peripherals interface 816 can include conventional components for establishing and maintaining communication between peripherals and processing system 804. Voice and data information received by wireless circuitry 808 (e.g., in speech recognition or voice command applications) is sent to one or more processors 818 via peripherals interface 816. One or more processors 818 are configurable to process various data formats for one or more application programs 834 stored on medium 802.

Peripherals interface 816 couple the input and output peripherals of the device to processor 818 and computer-readable medium 802. One or more processors 818 communicate with computer-readable medium 802 via a controller 820. Computer-readable medium 802 can be any device or medium that can store code and/or data for use by one or more processors 818. Medium 802 can include a memory hierarchy, including cache, main memory and secondary memory.

Device 800 also includes a power system 842 for powering the various hardware components. Power system 842 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 800 includes a camera 844. In some embodiments, device 800 includes sensors 846. Sensors can include accelerometers, compass, gyrometer, pressure sensors, audio sensors, light sensors, barometers, and the like. Sensors 846 can be used to sense location aspects, such as auditory or light signatures of a location.

In some embodiments, device 800 can include a GPS receiver, sometimes referred to as a GPS unit 848. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 818 run various software components stored in medium 802 to perform various functions for device 800. In some embodiments, the software components include an operating system 822, a communication module (or set of instructions) 824, a location module (or set of instructions) 826, an energy reports 828, a snapshot capture module 830, and other applications (or set of instructions) 834, such as a car locator app and a navigation app. Snapshot capture module 830 may include instructions to enable a processor 818 to capture a current snapshot of the call stack of device 800. The captured snapshots may be stored in memory, such as computer-readable medium 802. Energy reports 828 may include instructions for generating a report using one or more of the captured snapshots. Energy reports 828 may also include one or more previously generated energy reports.

Operating system 822 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 824 facilitates communication with other devices over one or more external ports 836 or via wireless circuitry 808 and includes various software components for handling data received from wireless circuitry 808 and/or external port 836. External port 836 (e.g., USB, FireWire, Lightning connector, 60-pin connector, etc.) is adapted for coupling directly to other devices or indirectly over a network (e.g., the Internet, wireless LAN, etc.).

Location/motion module 826 can assist in determining the current position (e.g., coordinates or other geographic location identifier) and motion of device 800. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 826 receives data from GPS unit 848 and analyzes the signals to determine the current position of the mobile device. In some embodiments, location/motion module 826 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 808 and is passed to location/motion module 826. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 800 based on the position coordinates of the corresponding transmitters. Regardless of the specific location technology used, location/motion module 826 receives information from which a location fix can be derived, interprets that information, and returns location information, such as geographic coordinates, latitude/longitude, or other location fix data.

The one or more applications 834 on the mobile device can include any applications installed on the device 800, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 806 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 806 can include a display and user input devices such as a keyboard, mouse, and/or track pad. In some embodiments, I/O subsystem 806 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 802) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 800 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering and use of data available from various sources to improve software application and the software development processes. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used for software energy diagnostics to improve energy consumption of particular software applications. Accordingly, use of such personal information data enables users to improve a particular application used by a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of collecting and processing energy consumption reports, the present technology can be configured to allow users to select to "opt in" or "opt out" of participation in the collection of personal information data during registration for services or anytime thereafter. In another example, users can select not to provide mood-associated data for energy consumption reports. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, energy consumption reports may be obtained based on non-personal information data or a bare minimum amount of personal information, such as the content being requested by the device associated with a user, other non-personal information available from other sources, or publicly available information.

Although the invention has been described with respect to specific embodiments, it will be appreciated that the invention is intended to cover all modifications and equivalents within the scope of the following claims.

What is claimed is:

1. A method comprising performing, by a server computer:

receiving an energy consumption report from a device, wherein the energy consumption report includes a plurality of call stacks associated with energy consumption of an application on the device;

analyzing the plurality of call stacks to determine a representative call stack of the energy consumption report, the representative call stack including a set of frames corresponding to programs in the representative call stack;

assigning the energy consumption report to a category of energy consumption reports based on differences between the representative call stack of the energy consumption report and a representative call stack assigned to a particular category;

receiving a request for energy consumption reports for a particular energy consumption category; and providing a representative set of energy consumption reports assigned to the particular energy consumption category.

2. The method of claim 1, wherein assigning the energy consumption report to the category of energy consumption reports is further based on:

determining that a distance between the representative call stack of the energy consumption report and the representative call stack assigned to the category of energy consumption reports is less than a threshold amount.

3. The method of claim 2, wherein the distance between the representative call stack of the energy consumption report and the representative call stack assigned to the category of energy consumption reports is zero.

4. The method of claim 1, wherein analyzing the plurality of call stacks to determine a representative call stack of the energy consumption report further comprises:

converting one or more programming counters associated with the plurality of call stacks to a symbolic form.

5. The method of claim 1, wherein analyzing the plurality of call stacks to determine a representative call stack of the energy consumption report further comprises:

selecting a call stack from the plurality of call stacks that appears with a highest frequency in the plurality of call stacks as the representative call stack.

6. The method of claim 1, further comprising:

generating a signature for the energy consumption report using the representative call stack of the energy consumption report, wherein the signature includes one or more frames from the representative call stack associated with the application, and wherein the signature excludes one or more frames of the representative call stack associated with one or more other applications.

7. The method of claim 6, wherein the signature includes up to five frames and excludes frames associated with an operating system.

8. The method of claim 1, further comprising:

removing one or more duplicate frames from the representative call stack.

9. The method of claim 1, further comprising:

providing a user interface to a requesting computer, the user interface accepting user input of a request for energy consumption information associated with a particular program;

determining a particular category of energy consumption reports that is associated with the particular program; and displaying, using the user interface, a representative set of energy consumption reports corresponding to the particular category of energy consumption reports.

10. The method of claim 1, wherein each of the representative set of energy consumption reports is assigned to a particular energy consumption category based on distances between a percentage of the plurality of call stacks of the energy consumption report and a corresponding percentage of call stacks assigned to the energy consumption category being less than a threshold.

11. A system comprising:

one or more processors a non-transitory computer-readable media including instructions which when executed by the one or more processors, cause the one or more processors to perform operations including:

receiving an energy consumption report from a device, wherein the energy consumption reports includes a plurality of call stacks associated with energy consumption of an application on the device;

analyzing the plurality of call stacks to determine a representative call stack of the energy consumption report, the representative call stack including a set of frames corresponding to programs in the representative call stack;

assigning the energy consumption report to a category of energy consumption reports based on differences between the representative call stack of the energy consumption report and a representative call stack assigned to a particular category;

receiving a request for energy consumption reports for a particular energy consumption category; and providing a representative set of energy consumption reports assigned to the particular energy consumption category.

12. The system of claim 11, where assigning the energy consumption report to the category of energy consumption reports is further based on:

determining that a distance between the representative call stack of the energy consumption report and the representative call stack assigned to a category of energy consumption reports is less than a threshold amount.

13. The system of claim 12, wherein the distance between the representative call stack of the energy consumption report and the representative call stack assigned to the category of energy consumption reports is zero.

14. The system of claim 11, stack of the energy consumption report further comprises:

converting one or more programming counters associated with the plurality of call stacks to a symbolic form.

15. The system of claim 11, wherein analyzing the plurality of call stacks to determine a representative call stack of the energy consumption report further comprises:

selecting a call stack from the plurality of call stacks that appears with a highest frequency in the plurality of call stacks as the representative call stack.

16. The system of claim 11, wherein the operations further include:

generating a signature for the energy consumption report using the representative call stack of the energy consumption report, wherein the signature includes one or more frames from the representative call stack associated with the application, and wherein the signature excludes one or more frames of the representative call stack associated with one or more other applications.

17. The system of claim 11, wherein the operations further include:

removing one or more duplicate frames from the representative call stack.

18. The system of claim 11, wherein the operations further include:
- providing a user interface to a requesting computer, the user interface accepting user input of a request for energy consumption information associated with a particular program;
- determining a particular category of energy consumption reports that is associated with the particular program; and
- displaying, using the user interface, a representative set of energy consumption reports corresponding to the particular category of energy consumption reports.

19. The system of claim 11, wherein each of the representative set of energy consumption reports is assigned to a particular energy consumption category based on distances between a percentage of the plurality of call stacks of the energy consumption report and a corresponding percentage of call stacks assigned to the energy consumption category being less than a threshold.

20. A non-transitory computer-readable media including instructions which when executed by one or more processors, cause the one or more processors to perform operations including:
- receiving an energy consumption report from a device, wherein the energy consumption reports includes a plurality of call stacks associated with energy consumption of an application on the device;
- analyzing the plurality of call stacks to determine a representative call stack of the energy consumption report, the representative call stack including a set of frames corresponding to programs in the representative call stack;
- assigning the energy consumption report to a category of energy consumption reports based on differences between the representative call stack of the energy consumption report and a representative call stack assigned to a particular category;
- receiving a request for energy consumption reports for a particular energy consumption category; and
- providing a representative set of energy consumption reports assigned to the particular energy consumption category.

* * * * *

UNITED STATES PATENT AND TRADEMARK OFFICE
CERTIFICATE OF CORRECTION

| | | |
|---|---|---|
| PATENT NO. | : 11,748,224 B2 | Page 1 of 1 |
| APPLICATION NO. | : 17/151005 | |
| DATED | : September 5, 2023 | |
| INVENTOR(S) | : David S. Choi et al. | |

It is certified that error appears in the above-identified patent and that said Letters Patent is hereby corrected as shown below:

In the Claims

Column 28, Claim 11, Line 11, delete "the energy consumption reports includes" and insert --the energy consumption report includes--

Signed and Sealed this
Fourteenth Day of November, 2023

Katherine Kelly Vidal
*Director of the United States Patent and Trademark Office*